(12) United States Patent
Ohno et al.

(10) Patent No.: US 12,017,602 B2
(45) Date of Patent: Jun. 25, 2024

(54) IN-SEAT AIRBAG DEVICE

(71) Applicant: TOYOTA JIDOSHA KABUSHIKI KAISHA, Toyota (JP)

(72) Inventors: Mitsuyoshi Ohno, Miyoshi (JP); Toshiki Iwama, Toyota (JP); Takeshi Yamamoto, Toki (JP); Masashi Hotta, Gifu-ken (JP); Yoshito Kusuhara, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/135,769

(22) Filed: Apr. 18, 2023

(65) Prior Publication Data
US 2023/0339422 A1 Oct. 26, 2023

(30) Foreign Application Priority Data

Apr. 26, 2022 (JP) ................. 2022-072611

(51) Int. Cl.
*B60R 21/233* (2006.01)
*B60R 21/00* (2006.01)
(Continued)

(52) U.S. Cl.
CPC ...... *B60R 21/233* (2013.01); *B60R 21/23138* (2013.01); *B60R 21/2338* (2013.01); *B60R 21/239* (2013.01); *B60R 2021/0048* (2013.01); *B60R 2021/23146* (2013.01); *B60R 2021/23308* (2013.01); *B60R 2021/23324* (2013.01);
(Continued)

(58) Field of Classification Search
CPC ............ B60R 21/233; B60R 21/23138; B60R 21/2338; B60R 21/239; B60R 2021/0048; B60R 21/207

See application file for complete search history.

(56) References Cited

U.S. PATENT DOCUMENTS 10,513,206 B2 * 12/2019 Spahn .................. B60N 2/4279
11,718,260 B2 * 8/2023 Ohachi .................. B60N 2/885
280/730.1
(Continued)

FOREIGN PATENT DOCUMENTS

CN 111660990 A * 9/2020 ......... B60R 21/0136
CN 114126930 A * 3/2022 ........... B60R 21/207
(Continued)

*Primary Examiner* — Faye M Fleming
(74) *Attorney, Agent, or Firm* — Dinsmore & Shohl LLP (57) ABSTRACT

An in-seat airbag device having an airbag main body including: an outer side airbag portion having a front-rear chamber that expands past one side of a head of a passenger toward a seat front side, a left-right chamber that expands from a seat front side end portion of the front-rear chamber toward a seat width direction inner side and is disposed at a seat front side of a face of the passenger, a distal end chamber that expands from a seat width direction inner side end portion of the left-right chamber toward a seat rear side and is disposed at another side of the head of the passenger, and a tether that joins the front-rear chamber and the distal end chamber; and an inner side airbag portion that expands and is disposed between the front-rear chamber, the left-right chamber and the distal end chamber.

7 Claims, 8 Drawing Sheets

(51) Int. Cl.
*B60R 21/231* (2011.01)
*B60R 21/2338* (2011.01)
*B60R 21/239* (2006.01)

(52) U.S. Cl.
CPC .............. *B60R 2021/23386* (2013.01); *B60R 2021/2395* (2013.01)

(56) References Cited

U.S. PATENT DOCUMENTS

| | | | |
|---|---|---|---|
| 11,745,693 B2 * | 9/2023 | Ohno | ................... B60R 21/237 280/730.2 |
| 2006/0131847 A1 | 6/2006 | Sato et al. | |
| 2022/0274555 A1 * | 9/2022 | Matsushita | ........... B60R 21/207 |
| 2023/0311806 A1 * | 10/2023 | Schock | ............... B60R 21/2338 280/743.2 |

FOREIGN PATENT DOCUMENTS

| | | | | |
|---|---|---|---|---|
| DE | 102020101051 A1 * | 7/2021 | | |
| DE | 102023102235 A1 * | 9/2023 | ........... | B60R 21/207 |
| DE | 102020109466 B4 * | 11/2023 | ........... | B60R 21/207 |
| JP | 2006-008105 A | 1/2006 | | |
| JP | 2017-197004 A | 11/2017 | | |
| JP | 2019-137307 A | 8/2019 | | |
| WO | 2019/166268 A1 | 6/2019 | | |

* cited by examiner

IN-SEAT AIRBAG DEVICE

CROSS-REFERENCE TO RELATED APPLICATION

This application is based on and claims priority under 35 USC 119 from Japanese Patent Application No. 2022-072611 filed on Apr. 26, 2022, the disclosure of which is incorporated by reference herein.

BACKGROUND

Technical Field

The present disclosure relates to an in-seat airbag device.

Related Art

There is conventionally known a passenger restraining device having an airbag module including: a supporting chamber that is highly-rigid, is installed in one side portion of a seatback, and expands in an "L" shape as seen in plan view at the time of a front collision of the vehicle; and an absorption chamber that has low rigidity, is provided at the restraining surface of the supporting chamber that is positioned in front of the head of the passenger, and is formed in a shape that is convex toward the passenger side (see, for example, International Patent Application Publication No. 2019/166268).

However, in an in-seat airbag device that expands at one side, the fixed point of the airbag main body at the rear side is supported in a cantilevered manner at one side of the seatback. Therefore, in the midst of restraining the upper half of the passenger in the latter half of a collision, the airbag main body rotates around this fixed point in a direction of moving away from the head of the passenger. In addition, because the restraining surface of the absorption chamber is formed in a convex shape, it is easy for the head of the passenger to escape from the center of the absorption chamber toward the outer side. As a result, there is the concern that the head of the passenger will slip-out from the airbag main body.

Further, in an airbag device that expands from the rear side of the head of the passenger and restricts the upper half (the chest region) of the passenger, there is the possibility that, during the restraining, the airbag main body will rise up and be unable to sufficiently restrain the passenger. As a countermeasure thereto, a structure that restrains only the head of the passenger by the airbag main body has been conceived. However, because a large tensile load is applied only to the head of the passenger at the time of restraining, there is the possibility that the neck of the passenger will tilt rearward (bend rearward) greatly.

SUMMARY

The present disclosure provides an in-seat airbag device that, at the time of restraining the head of a passenger, can suppress rearward tilting of the neck of the passenger while suppressing slipping-out of the head of the passenger from the airbag main body.

An in-seat airbag device of a first aspect relating to the present disclosure has an airbag main body that is structured so as to include: an outer side airbag portion having a front-rear chamber that, due to gas jetted-out from an inflator that operates due to a collision of a vehicle being detected or predicted, expands past one side of a head of a passenger toward a seat front side and is disposed at the one side of the head of the passenger, a left-right chamber that expands from a seat front side end portion of the front-rear chamber toward a seat width direction inner side and is disposed at a seat front side of a face of the passenger, a distal end chamber that expands from a seat width direction inner side end portion of the left-right chamber toward a seat rear side and is disposed at another side of the head of the passenger, and a tether that joins the front-rear chamber and the distal end chamber; and an inner side airbag portion that, due to gas that flows therein from the outer side airbag portion, expands and is disposed between the front-rear chamber, the left-right chamber and the distal end chamber, and has a head restraining surface that restrains the head of the passenger.

In accordance with the disclosure of the first aspect, when a collision of the vehicle is detected or predicted, the inflator operates and jets-out gas and expands the outer side airbag portion. Namely, the front-rear chamber of the outer side airbag portion expands past one side of the head of the passenger toward the seat front side, and is disposed at the one side of the head of the passenger. The left-right chamber expands from the seat front side end portion of the front-rear chamber toward the seat width direction inner side, and is disposed at the seat front side of the face of the passenger. The distal end chamber of the outer side airbag portion expands from the seat width direction inner side end portion of the left-right chamber toward the seat rear side, and is disposed at the another side of the head of the passenger. The front-rear chamber and the distal end chamber are joined by the tether. Further, due to gas that flows-in from the outer side airbag portion, the inner side airbag portion, which has the head restraining surface that restrains the head of the passenger, expands and is disposed between the front-rear chamber, the left-right chamber and the distal end chamber. Namely, the front surface portion and the left and right both side surface portions of the inner side airbag portion that has the head restraining surface are covered by the outer side airbag portion.

Accordingly, the inner side airbag portion obtains reaction force from the outer side airbag portion. Due thereto, the head of the passenger is restrained by the inner side airbag portion while crushing the inner side airbag portion toward the seat front side. Namely, at the time when the head of the passenger is restrained, the amount of movement of the head of the passenger toward the front side becoming small, with respect to the amount of movement of the chest region of the passenger toward the front side that is determined by the restraining force of the seatbelt, is suppressed. In other words, the head of the passenger is moved over a long stroke toward the front side, and the tensile load applied to the head of the passenger is kept low. Accordingly, rearward tilting of the neck of the passenger is suppressed. Because the front-rear chamber and the distal end chamber are joined by the tether, it is difficult for the distal end chamber to move in the direction of moving away from the front-rear chamber. Due thereto, the head of the passenger slipping-out from the airbag main body is suppressed.

Further, an in-seat airbag device of a second aspect is the in-seat airbag device of the first aspect, wherein, as seen in plan view, a projecting portion, which projects-out further toward a seat rear side than a front-rear chamber side, is formed at a distal end chamber side of the head restraining surface of the inner side airbag portion.

In accordance with the disclosure of the second aspect, as seen in plan view, a projecting portion, which projects-out further toward the seat rear side than the front-rear chamber side, is formed at the distal end chamber side of the head restraining surface of the inner side airbag portion. Accordingly, at the time when the head of the passenger is restrained by the inner side airbag portion, it is difficult for the head of the passenger to slip-out toward the distal end chamber side. Namely, the head of the passenger slipping-out from the airbag main body is suppressed more effectively.

Further, an in-seat airbag device of a third aspect is the in-seat airbag device of the second aspect, wherein, as seen in plan view, a length in a seat front-rear direction of the inner side airbag portion except for the projecting portion is made to be longer than a length in a seat width direction.

In accordance with the disclosure of the third aspect, as seen in plan view, the length, in the seat front-rear direction, of the inner side airbag portion except for the projecting portion is made to be longer than the length in the seat width direction. Accordingly, the amount of the stroke of the head of the passenger toward the seat front side is ensured to be long, as compared with a case in which the length, in the seat front-rear direction, of the inner side airbag portion except for the projecting portion is made to be shorter than the seat width direction length. Accordingly, rearward tilting of the neck of the passenger is suppressed.

Further, an in-seat airbag device of a fourth aspect is the in-seat airbag device of the first aspect, wherein, as seen in plan view, the inner side airbag portion is formed substantially in a shape of an oval having a predetermined thickness in a seat width direction, and a seat rear side end portion of the inner side airbag portion is disposed at an incline with respect to a seat front-rear direction so as to move away from the front-rear chamber.

In accordance with the disclosure of the fourth aspect, as seen in plan view, the inner side airbag portion is formed substantially in the shape of an oval having a predetermined thickness in the seat width direction, and the seat rear side end portion of the inner side airbag portion is disposed at an incline with respect to the seat front-rear direction so as to move away from the front-rear chamber. Accordingly, the head of the passenger is restrained so as to be sandwiched by the outer side airbag portion and the inner side airbag portion. Due thereto, the head of the passenger slipping-out from the airbag main body is suppressed. Further, the head of the passenger is moved over a long stroke toward the front side, and the tensile load applied to the head of the passenger is kept low. Accordingly, rearward tilting of the neck of the passenger is suppressed.

Further, an in-seat airbag device of a fifth aspect is the in-seat airbag device of the any one of the first aspect to the fourth aspect, wherein: a vent hole through which the gas is discharged is formed in the inner side airbag portion, and an opening surface area of the vent hole is made to be larger than an opening surface area of a flow-in port that is for the gas to flow-in from the outer side airbag portion into the inner side airbag portion.

In accordance with the disclosure of the fifth aspect, the opening surface area of the vent hole formed in the inner side airbag portion is made to be larger than the opening surface area of the flow-in port that is for the gas to flow-in from the outer side airbag portion into the inner side airbag portion. Accordingly, at the time when the head of the passenger is restrained, the internal pressure of the inner side airbag portion decreases, and the inner side airbag portion becomes soft. Due thereto, the head of the passenger is moved over a long stroke toward the front side. Therefore, the head of the passenger slipping-out from the airbag main body is suppressed, and rearward tilting of the neck of the passenger is suppressed.

Further, an in-seat airbag device of a sixth aspect is the in-seat airbag device of any one of the first aspect to the fourth aspect, wherein: a check valve, which permits flowing-in of the gas from the outer side airbag portion into the inner side airbag portion and restricts flowing-out of the gas from the inner side airbag portion to the outer side airbag portion, is provided at a flow-in port that is for the gas to flow-in from the outer side airbag portion into the inner side airbag portion, and a variable vent hole, which is closed while the gas is flowing in from the outer side airbag portion into the inner side airbag portion and is opened when the head of the passenger is restrained, is provided at the inner side airbag portion.

In accordance with the disclosure of the sixth aspect, the variable vent hole, which is closed when gas flows in from the outer side airbag portion into the inner side airbag portion and is opened when the head of the passenger is restrained, is provided at the inner side airbag portion. Accordingly, at the time when the head of the passenger is restrained, the internal pressure of the inner side airbag portion decreases, and the inner side airbag portion becomes soft. Due thereto, the head of the passenger is moved over a long stroke toward the front side. Therefore, the head of the passenger slipping-out from the airbag main body is suppressed, and rearward tilting of the neck of the passenger is suppressed.

Further, an in-seat airbag device of a seventh aspect is the in-seat airbag device of any one of the first aspect to the fourth aspect, wherein the tether is formed in a substantial "Y" shape as seen in plan view, the tether having one end portion attached to the distal end chamber, and having a front side other end portion and a rear side other end portion, which are separated from each other in a seat front-rear direction and are respectively attached to the front-rear chamber.

In accordance with the disclosure of the seventh aspect, the tether is formed in a substantial "Y" shape as seen in plan view. One end portion of the tether is attached to the distal end chamber, and the front side another end portion and the rear side another end portion, which are apart in the seat front-rear direction, of the tether are respectively attached to the front-rear chamber. Here, if the distal end chamber and the front-rear chamber are joined by the tether that is rectilinear, at the time when the head of the passenger is restrained, there is the concern that the front-rear chamber will bend from the portion thereof to which the tether is attached, and there is the concern that the head of the passenger will slip-out from the airbag main body. In contrast, because the front side another end portion and the rear side another end portion of the tether are apart in the seat front-rear direction and are attached to the front-rear chamber, the tension of the tether is dispersed, and bending of the front-rear chamber is suppressed. Accordingly, the head of the passenger slipping-out from the airbag main body is suppressed.

As described above, in accordance with the present disclosure, in an in-seat airbag device, at the time when the head of a passenger is restrained, rearward tilting of the neck of the passenger can be suppressed while slipping-out of the head of the passenger from the airbag main body is suppressed.

BRIEF DESCRIPTION OF THE DRAWINGS

Exemplary embodiments of the present disclosure will be described in detail based on the following figures, wherein.

DETAILED DESCRIPTION

Embodiments relating to the present disclosure are described in detail hereinafter on the basis of the drawings. Note that, for convenience of explanation, arrow UP that is shown appropriately in the respective drawings indicates the seat upward direction, arrow FR indicates the seat forward direction, and arrow RH indicates the seat rightward direction. Accordingly, in the following description, when vertical, front-rear and left-right directions are mentioned without being specified, they refer to the vertical, front-rear and left-right of the vehicle seat. Further, the left-right direction has the same meaning as the seat width direction.

Figure 1:
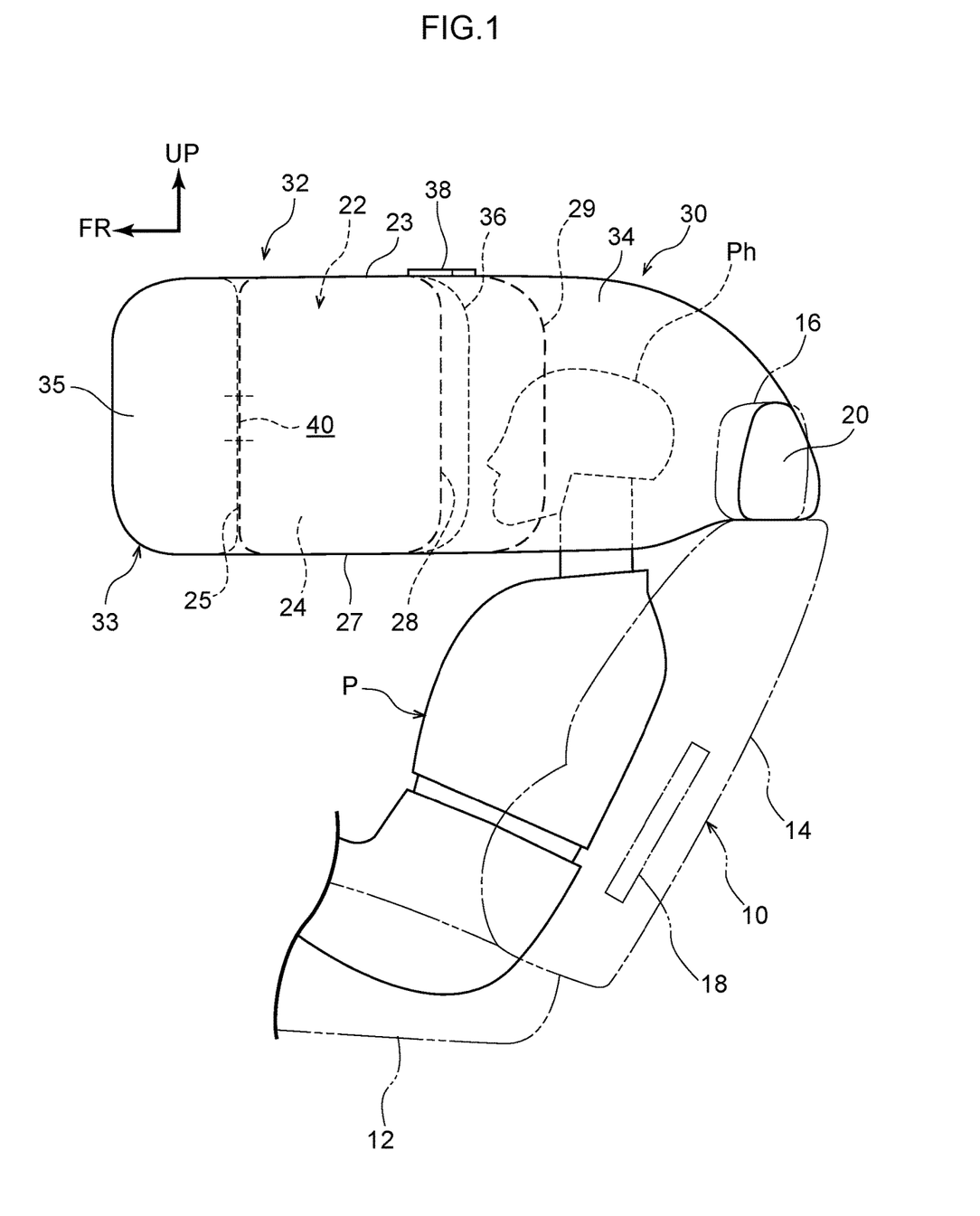
FIG. 1 is a side view illustrating a state after expansion of an in-seat airbag device relating to a first embodiment.
Figure 2:
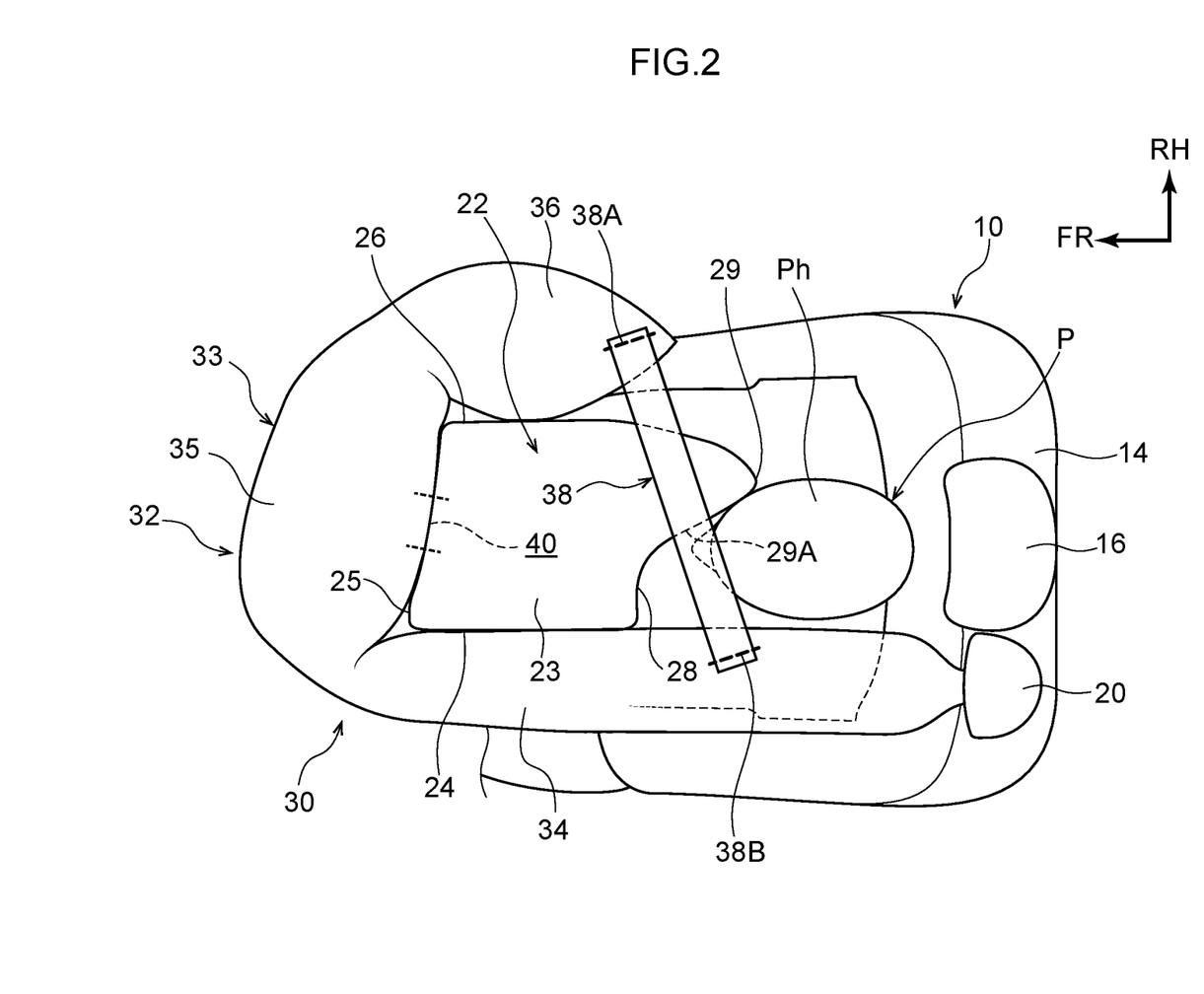
FIG. 2 is a plan view illustrating the state after expansion of the in-seat airbag device relating to the first embodiment.

As illustrated in FIG. 1 and FIG. 2, an in-seat airbag device (hereinafter simply called "airbag device") 30 relating to the present embodiment is provided at the seat width direction outer side (the left side in the illustrated structure) of a vehicle seat 10. Note that the vehicle seat 10 relating to the present embodiment is described as a rear seat, but the airbag device 30 may be provided at a front seat. Further, as an example, this rear seat is the rear seat at the side of the right side window (not illustrated).

Accordingly, an airbag main body 32 that is described later expands so as to pass between a head Ph of a passenger P who is at the side window side and the head of the passenger (not illustrated) who is at the center seat side. Note that the airbag main body 32 may expand so as to pass between the side window and the head Ph of the passenger P. Further, the "passenger P" in the present embodiment is a passenger corresponding to, as an example, an AM50 human dummy (50th percentile U.S. adult male).

First Embodiment

The airbag device 30 relating to the first embodiment is described first. As illustrated in FIG. 1 and FIG. 2, the vehicle seat 10 has a seat cushion 12 on which the passenger P sits (that supports the buttocks and thigh regions of the passenger P), a seatback 14 that supports the back portion of the passenger P, and a headrest 16 that supports the head Ph of the passenger P.

A case portion 20 that accommodates the airbag main body 32 that is described later is disposed at the left side (one side) of the headrest 16. Note that the case portion 20 is supported by one of the side frames (not illustrated) that structure the left and right both side portions of the seatback frame provided at the interior of the seatback 14.

Specifically, the side frames are formed in the shapes of flat plates that extend in the vertical direction. A cylindrical inflator 18 (see FIG. 1) is mounted integrally via a bracket (not illustrated) or the like to the outer surface of a side frame such that the axially central portion of the inflator 18 is directed in the vertical direction. Further, the lower end portion of a metal pipe (not illustrated) serving as a supply pipe is mounted to, by being fit with, a jetting port (not illustrated) that is the upper end portion of the inflator 18, and the upper portion of the metal tube is inserted-through and fixed to the case portion 20.

Due thereto, the case portion 20 is supported at the side frame via the inflator 18 and the metal tube. Note that the rear end portion of the airbag main body 32 that is described later is attached to the upper end portion of this metal tube, such that the gas jetted-out from the inflator 18 can be supplied to the interior of the airbag main body 32.

The inflator 18 is electrically connected to an airbag ECU (not illustrated) that is provided at the vehicle. The airbag ECU and a detecting device (not illustrated), such as an acceleration sensor or the like provided at the vehicle, are electrically connected. Accordingly, due to a collision of the vehicle being detected by the detecting device, the inflator 18 operates via the airbag ECU, and jets-out gas instantaneously.

Note that the inflator 18 may be a structure that operates due to a collision of the vehicle being predicted by a collision predicting sensor (not illustrated) or the like, and not a structure that operates due to a collision of the vehicle being detected.

As illustrated in FIG. 1 and FIG. 2, the airbag device 30 has the airbag main body 32 that, due to gas being jetted-out from the inflator 18, ruptures a portion of the case portion 20 and bursts forth, and expands from the rear side (specifically, the rear left side) of the head Ph of the passenger P seated in the vehicle seat 10 toward the front side. This airbag main body 32 is a two-layer airbag structure that is structured to include an outer side airbag portion 33 and an inner side airbag portion 22.

The outer side airbag portion 33 has a front-rear chamber 34 that expands past the left side (the one side) of the head Ph of the passenger P toward the front side and is disposed at the left side of the head Ph of the passenger P (between the head Ph of the passenger P who is at the side window side and the head of the unillustrated passenger who is at the center seat side), a left-right chamber 35 that expands from the front side end portion of the front-rear chamber 34 toward the seat width direction inner side and is disposed at the front side of the face of the passenger P, and a distal end chamber 36 that expands from the seat width direction inner side end portion of the left-right chamber 35 toward the rear side and is disposed at the right side (another side) of the head Ph of the passenger P.

Further, the outer side airbag portion 33 has a tether 38 that is shaped as a strip of a predetermined width and joins an intermediate portion at the upper end portion of the front-rear chamber 34 and the distal end portion (the rear end portion) at the upper end portion of the distal end chamber

36. Namely, one end portion 38A of the tether 38 is attached by sewing to the distal end portion (the rear end portion) at the upper end portion of the distal end chamber 36, and another end portion 38B of the tether 38 is attached by sewing to an intermediate portion at the upper end portion of the front-rear chamber 34.

Due thereto, the outer side airbag portion 33 is set in a state of being bent in a substantial "J" shape as seen in plan view, and, together with the inner side airbag portion 22, can restrain at least the head Ph of the passenger P. Note that, as illustrated in FIG. 2, because the tether 38 is positioned at the upper side of the head Ph of the passenger P, the tether 38 does not interfere with (does not hit) the head Ph of the passenger P.

Due to gas flowing into the inner side airbag portion 22 from the outer side airbag portion 33, the inner side airbag portion 22 expands and is disposed between the front-rear chamber 34 and the left-right chamber 35 and the distal end chamber 36, i.e., within the space surrounded by the front-rear chamber 34 and the left-right chamber 35 and the distal end chamber 36. The height of the inner side airbag portion 22 is equivalent to the height of the outer side airbag portion 33.

More specifically, the inner side airbag portion 22 has a left side surface portion 24 that faces the front-rear chamber 34, a front surface portion 25 that faces the left-right chamber 35, a right side surface portion 26 that faces the distal end chamber 36, and a rear surface portion 28 that faces the head Ph of the passenger P. Note that, as illustrated in FIG. 1 and FIG. 2, the rear surface portion 28 is a head restraining surface that restrains the head Ph of the passenger P.

Further, this inner side airbag portion 22 has an upper surface portion 23 that extends integrally from the upper end portion of the front surface portion 25 toward the rear side and whose peripheral edge portion is attached by sewing to the upper end portion of the left side surface portion 24, the upper end portion of the right side surface portion 26 and the upper end portion of the rear surface portion 28, and a lower surface portion 27 that extends integrally from the lower end portion of the front surface portion 25 toward the rear side and whose peripheral edge portion is attached by sewing to the lower end portion of the left side surface portion 24, the lower end portion of the right side surface portion 26 and the lower end portion of the rear surface portion 28.

Figure 3:
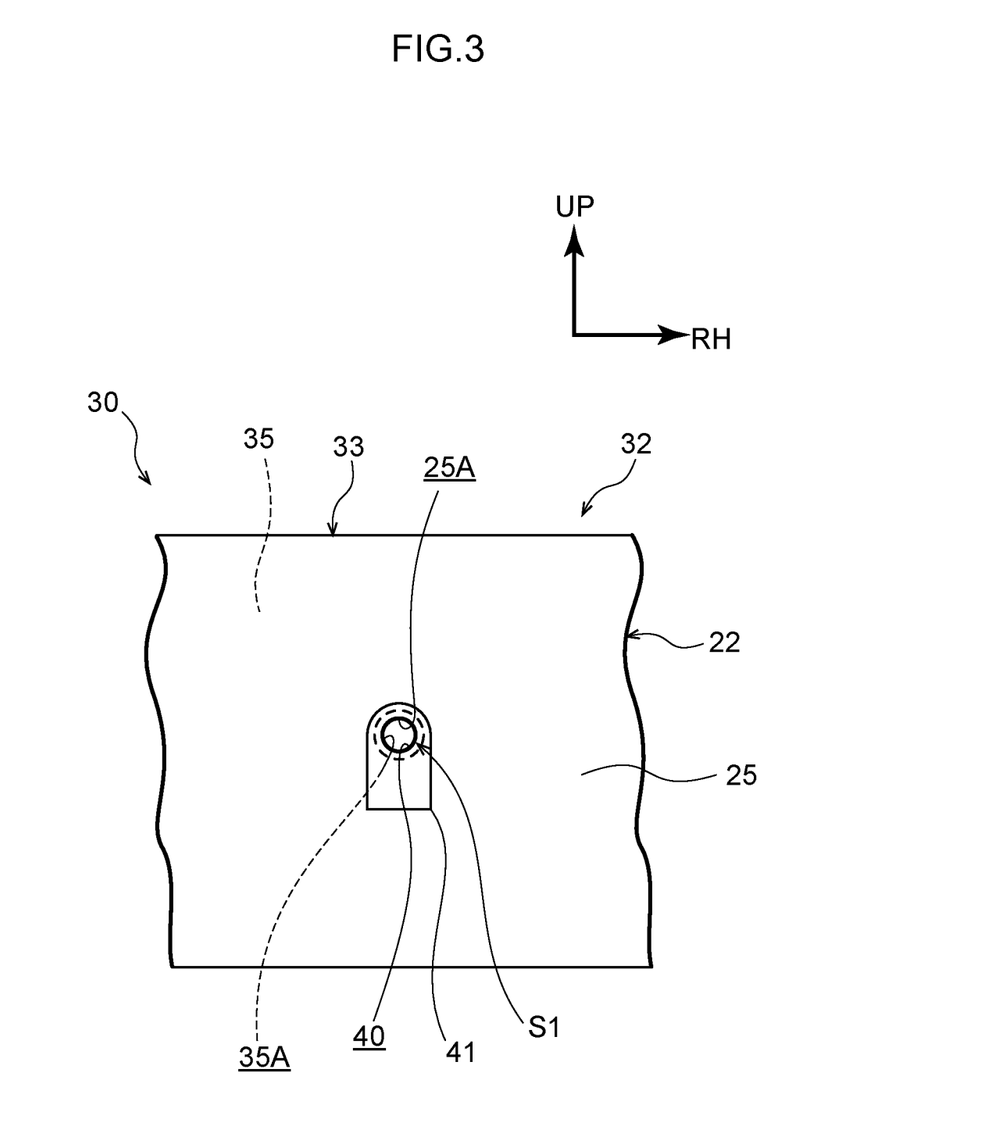
FIG. 3 is a partially-enlarged, schematic front view illustrating a flow-in port of an outer side airbag portion and an inner side airbag portion that structure an airbag main body of the in-seat airbag device relating to the first embodiment.

As illustrated in FIG. 3, an opening portion 35A and an opening portion 25A that are respectively circular as seen in front view are formed in the central portion of the rear surface of the left-right chamber 35 and the central portion of the front surface portion 25. The peripheral edge portions of these opening portions 35A, 25A are, together with reinforcing cloths 41, joined integrally by sewing. Due thereto, the outer side airbag portion 33 and the inner side airbag portion 22 are joined integrally, and a flow-in port 40 of gas from the left-right chamber 35 to the inner side airbag portion 22 is formed.

Further, as seen in plan view, a projecting portion 29, which projects-out further toward the rear side than the front-rear chamber 34 side at the rear surface portion 28 (the head restraining surface), is formed integrally at the distal end chamber 36 side of the rear surface portion 28 (the head restraining surface) of the inner side airbag portion 22. The projecting portion 29 projects-out in a substantial "V" shape as seen in plan view, and the surface thereof that faces the front-rear chamber 34 is an inclined surface 29A that is disposed so as to be inclined with respect to the front-rear direction. Further, as seen in plan view, the front-rear direction length of the inner side airbag portion 22, except for the projecting portion 29, is longer than the seat width direction length.

Operation of the airbag device 30 relating to the first embodiment that is structured as described above is described next.

When the detecting device detects that the vehicle has front-collided, the inflator 18 operates and instantaneously jets gas into the interior of the airbag main body 32. When gas is jetted to the airbag main body 32 interior, due to the expansion of the airbag main body 32 (i.e., by being pushed from the inner side by the airbag main body 32), the case portion 20 ruptures.

Then, the outer side airbag portion 33 and the inner side airbag portion 22 of the airbag main body 32 expand from the case portion 20 past the left side of the head Ph of the passenger P (through the gap between the head Ph of the passenger P at the side window side and the head of the unillustrated passenger at the center seat side) toward the front side.

Namely, when the front-rear chamber 34 of the outer side airbag portion 33 inflates and expands and is disposed at the left side of the head Ph of the passenger P, gas flows from the front side end portion of the front-rear chamber 34 into the left-right chamber 35, and the left-right chamber 35 inflates and expands toward the seat width direction inner side and is disposed at the front side of the face of the passenger P.

Then, the gas further flows from the left-right chamber 35 into the distal end chamber 36, and the distal end chamber 36 expands from the seat width direction inner side end portion of the left-right chamber 35 toward the rear side, and is disposed at the right side of the head Ph of the passenger P. Note that, at this time, the position of the distal end chamber 36 moving too far away from the front-rear chamber 34 is restricted by the tether 38.

Further, when gas flows into the left-right chamber 35, gas flows from the left-right chamber 35 via the flow-in port 40 into the inner side airbag portion 22. The inner side airbag portion 22 inflates and expands, and is disposed between the front-rear chamber 34, the left-right chamber 35 and the distal end chamber 36.

Here, the rear surface portion 28 of the inner side airbag portion 22 is the head restraining surface that restrains the head Ph of the passenger P. Namely, the front surface portion 25, the left side surface portion 24 and the right side surface portion 26 of the inner side airbag portion 22 that has the head restraining surface are covered by the outer side airbag portion 33.

Accordingly, when the head restraining surface (the rear surface portion 28) of the inner side airbag portion 22 is pushed toward the front side, the inner side airbag portion 22 can obtain reaction force from the outer side airbag portion 33 (in particular, the rear surface of the left-right chamber 35 that faces the front surface portion 25 is the reaction force surface). Due thereto, the head Ph of the passenger P seated in the vehicle seat 10 is restrained by the inner side airbag portion 22 while crushing the inner side airbag portion 22 toward the front side.

Namely, at the time when the head of the passenger P is restrained, the amount of movement of the head Ph of the passenger P toward the front side becoming small, with respect to the amount of movement of the chest region of the passenger P toward the front side that is determined by the restraining force of the seatbelt, can be suppressed. In other words, the head Ph of the passenger P can be moved over a long stroke toward the front side, and the tensile load applied to the head Ph of the passenger P can be kept low (an F-S characteristic of a low load and a high stroke can be obtained). Accordingly, rearward tilting of the neck of the passenger P can be suppressed.

Because the front-rear chamber 34 and the distal end chamber 36 are joined by the tether 38, it is difficult for the distal end chamber 36 to move in the direction of moving away from the front-rear chamber 34. Due thereto, the head Ph of the passenger P slipping-out from the airbag main body 32 (the inner side airbag portion 22 and the outer side airbag portion 33) can be suppressed.

Moreover, as seen in plan view, the projecting portion 29, which projects-out further toward the rear side than the front-rear chamber 34 side, is formed at the distal end chamber 36 side of the head restraining surface (the rear surface portion 28) of the inner side airbag portion 22. Accordingly, at the time when the head of the passenger P is restrained by the inner side airbag portion 22, it is difficult for the head Ph of the passenger P to slip-out toward the distal end chamber 36 side. Namely, the head Ph of the passenger P slipping-out from the airbag main body 32 can be suppressed effectively.

Further, the surface, which faces the front-rear chamber 34, of the projecting portion 29 is the inclined surface 29A that is disposed at an incline with respect to the front-rear direction. Therefore, when the head Ph of the passenger P pushes this inclined surface 29A, a cancelling moment, which is in the direction opposite the rotation moment that rotates the outer side airbag portion 33 in the direction of moving away from the head Ph of the passenger P, can be generated at the rear end portion of the outer side airbag portion 33. Due thereto, the head Ph of the passenger P slipping-out from the airbag main body 32 can be suppressed even more.

Further, as seen in plan view, the front-rear direction length, other than the projecting portion 29, of the inner side airbag portion 22 is made to be longer than the seat width direction length. Accordingly, the amount of the stroke of the head Ph of the passenger P toward the front side can be ensured to be long, as compared with a case in which the front-rear direction length of the inner side airbag portion 22 other than the projecting portion 29 is made to be shorter than the seat width direction length. Accordingly, rearward tilting of the neck of the passenger P can be suppressed more effectively.

Modified Example

Figure 4:
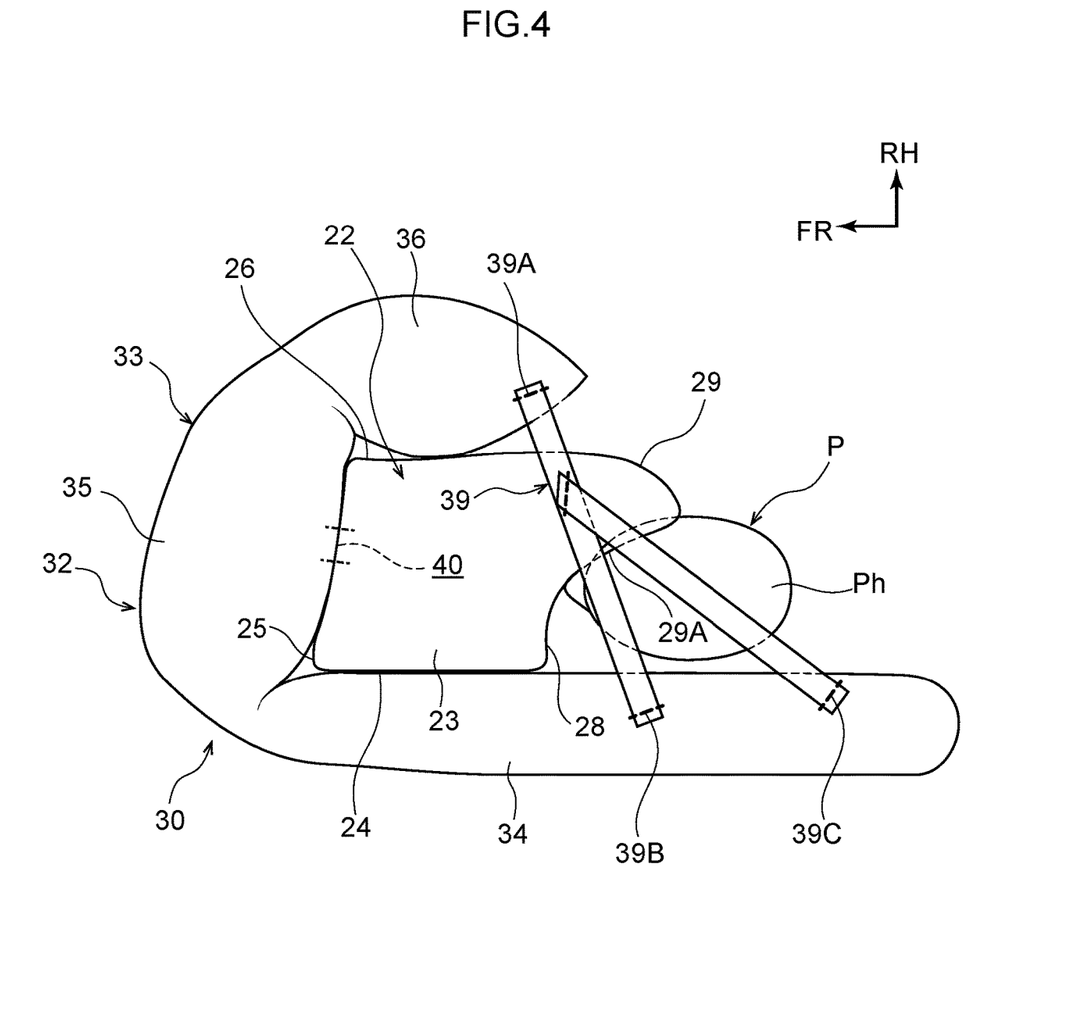
FIG. 4 is a plan view illustrating a state after expansion of an in-seat airbag device relating to a modified example of the first embodiment.

Note that, as illustrated in FIG. 4, the tether 38 may be made to be a tether 39 that is formed in a substantial "Y" shape as seen in plan view. Namely, the tether 39 may be of a shape in which one end portion 39A thereof is attached by sewing to the distal end portion (the rear end portion) at the upper end portion of the distal end chamber 36, and a front side another end portion 39B and a rear side another end portion 39C, which are apart in the front-rear direction, are respectively attached by sewing to intermediate portions at the upper end portion of the front-rear chamber 34.

In accordance therewith, the head Ph of the passenger P slipping-out from the airbag main body 32 can be suppressed more effectively. Namely, if the distal end chamber 36 and the front-rear chamber 34 are joined by the tether 38 that is rectilinear, at the time when the head of the passenger P is restrained, there is the concern that the front-rear chamber 34 will bend toward the seat width direction outer side from the portion thereof to which the tether 38 is attached (the another end portion 38B of the tether 38 illustrated in FIG. 2), and there is the concern that the head Ph of the passenger P will slip-out from the airbag main body 32.

In contrast, in the case of the tether 39 that is formed in a substantial "Y" shape as seen in plan view, the front side another end portion 39B and the rear side another end portion 39C of the tether 39 are apart in the front-rear direction, and are attached to the upper end portion of the front-rear chamber 34. Therefore, the tension of the tether 39 can be dispersed, and bending of the front-rear chamber 34 can be suppressed. Accordingly, the head Ph of the passenger P slipping-out from the airbag main body 32 can be suppressed.

In some embodiments, the rear side another end portion 39C of the tether 39 may be attached as much as possible to the rear portion side of the front-rear chamber 34. In accordance therewith, bending of the front-rear chamber 34 can be suppressed even more. Further, the tether 39 is not limited to being formed by a single cloth in a substantial "Y" shape as seen in plan view, and, as illustrated, may be formed so as to be substantially "Y" shaped in plan view by two rectilinear base cloths being sewn together.

Second Embodiment

The airbag device 30 relating to the second embodiment is described next. Note that regions that are equivalent to those of the above-described first embodiment are denoted by the same reference numerals, and detailed description thereof (including description of common operations) is omitted appropriately.

Figure 5:
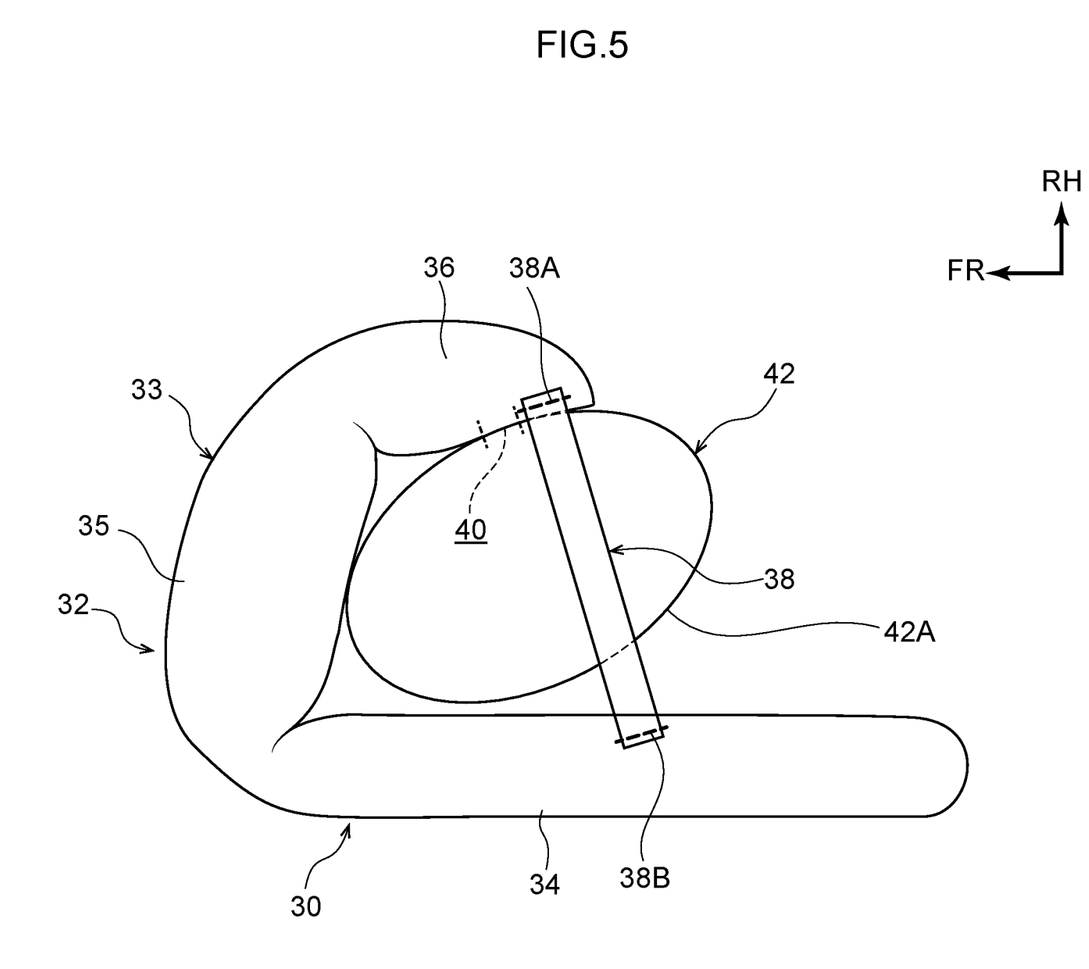
FIG. 5 is a plan view illustrating a state after expansion of an in-seat airbag device relating to a second embodiment.

As illustrated in FIG. 5, the airbag main body 32 of the airbag device 30 relating to the second embodiment differs from the above-described first embodiment only with regard to the point that the airbag main body 32 has, instead of the inner side airbag portion 22, an inner side airbag portion 42 that is equivalent to a so-called driver's seat side airbag, and the point that the flow-in port 40 is formed in the distal end chamber 36 and not in the left-right chamber 35.

This inner side airbag portion 42 is formed in a circular shape as seen in a side view, and, as seen in plan view, is formed substantially in the shape of an oval having a predetermined thickness in the seat width direction. Further, the inner side airbag portion 42 is disposed at an incline with respect to the front-rear direction, such that the rear side end portion thereof moves away from the front-rear chamber 34.

In accordance with the inner side airbag portion 42 of this structure, the head Ph of the passenger P is restrained so as to be sandwiched by the front-rear chamber 34 of the outer side airbag portion 33 and a head restraining surface 42A of the inner side airbag portion 42. Accordingly, the head Ph of the passenger P slipping-out from the airbag main body 32 can be suppressed.

Further, because the head Ph of the passenger P passes through between the front-rear chamber 34 of the outer side airbag portion 33 and the inner side airbag portion 42 and moves toward the front side, the head Ph of the passenger P can be moved over a long stroke. Accordingly, the tensile load that is applied to the head Ph of the passenger P can be kept low, and rearward tilting of the neck of the passenger P can be suppressed.

Third Embodiment

The airbag device 30 relating to the third embodiment is described next. Note that regions that are equivalent to those of the above-described second embodiment are denoted by the same reference numerals, and detailed description thereof (including description of common operations) is omitted appropriately.

Figure 6:
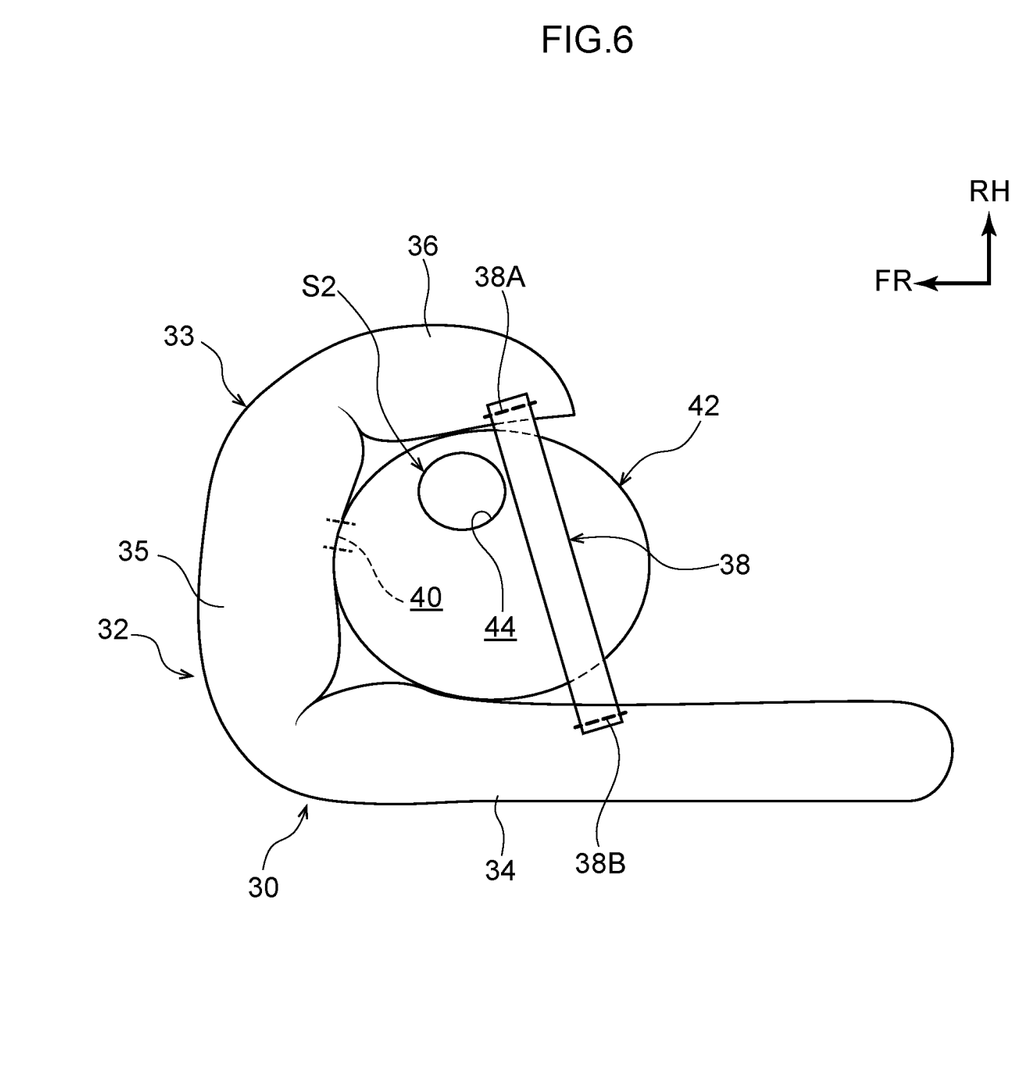
FIG. 6 is a plan view illustrating a state after expansion of an in-seat airbag device relating to a third embodiment.
Figure 7A:
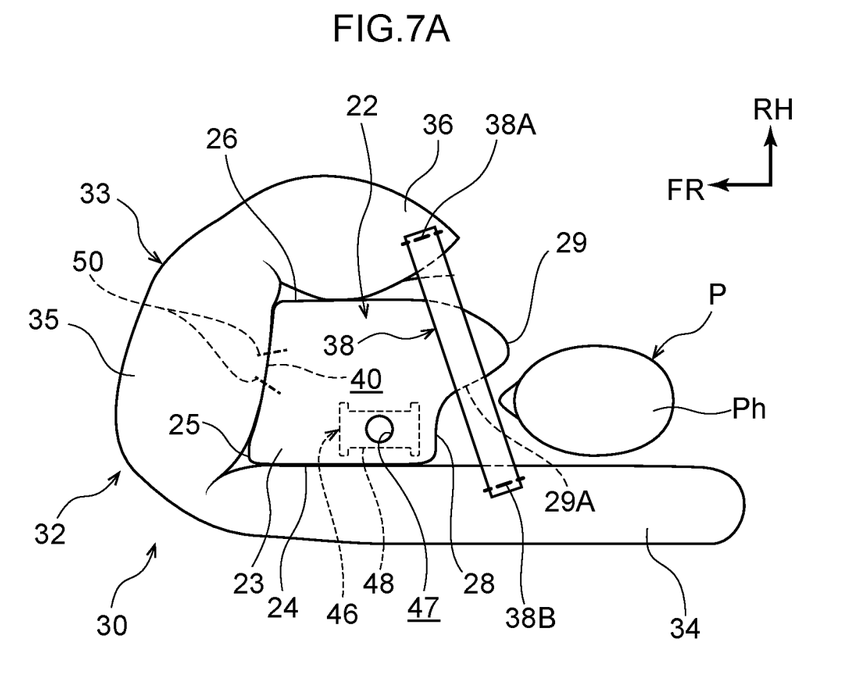
FIG. 7A is a plan view illustrating an initial stage of expansion of an in-seat airbag device relating to a fourth embodiment.
Figure 7B:
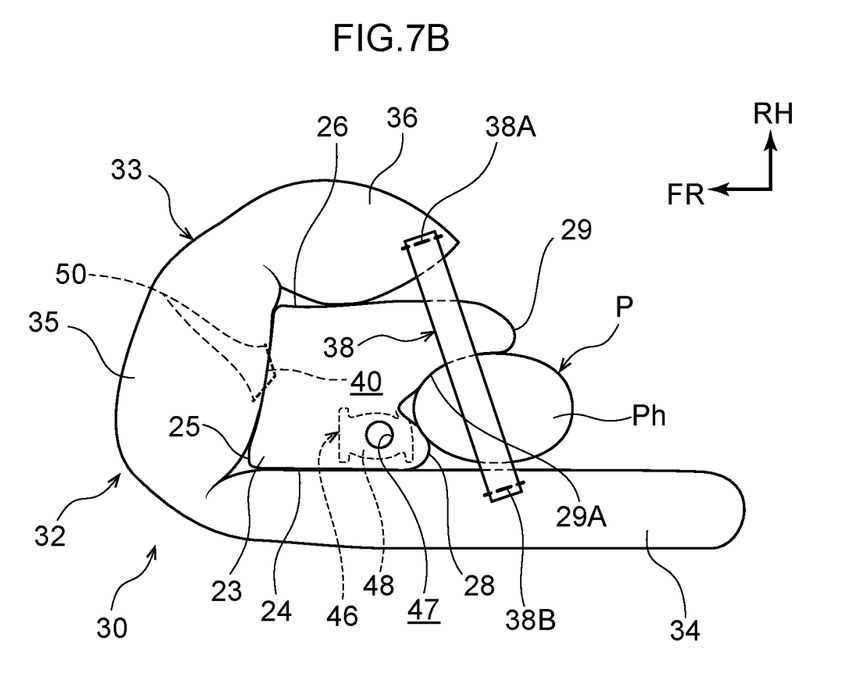
FIG. 7B is a plan view illustrating a latter stage of expansion of the in-seat airbag device relating to the fourth embodiment.

As illustrated in FIG. 6, the airbag main body 32 of the airbag device 30 relating to the third embodiment differs from the above-described second embodiment only with regard to the point that the inner side airbag portion 42 of the second embodiment is disposed along the front-rear direction (is not disposed at an incline with respect to the front-rear direction), and the point that the flow-in port 40 is formed in the left-right chamber 35 and not in the distal end chamber 36, and the point that a vent hole 44 through which gas is discharged is formed in the inner side airbag portion 42.

The vent hole 44 is formed at an appropriate position of, for example, the upper surface portion of the inner side airbag portion 42. Opening surface area S2 of the vent hole 44 is made to be larger than opening surface area S1 (see FIG. 3) of the flow-in port 40 that is for gas to flow-in from the outer side airbag portion 33 into the inner side airbag portion 42 (e.g., S2=S1×2).

In accordance with the inner side airbag portion 42 that has the vent hole 44 of this size, at the time when the head of the passenger P is restrained, the internal pressure of the inner side airbag portion 42 can be reduced, and the inner side airbag portion 42 can be made to be soft. Due thereto, the head Ph of the passenger P can be moved over a long stroke toward the front side. Therefore, the head Ph of the passenger P slipping-out from the airbag main body 32 can be suppressed, and rearward tilting of the neck of the passenger P can be suppressed.

Fourth Embodiment

Finally, the airbag device 30 relating to the fourth embodiment is described. Note that regions that are equivalent to those of the above-described first embodiment are denoted by the same reference numerals, and detailed description thereof (including description of common operations) is omitted appropriately.

As illustrated in FIG. 7A through FIG. 8B, the airbag main body 32 of the airbag device 30 relating to the fourth embodiment differs from the above-described first embodiment only with regard to the point that a variable vent hole 46 which can open and close in order to discharge gas is provided in the inner side airbag portion 22, and a check valve 50 is provided at the flow-in port 40 that is for gas to flow-in from the outer side airbag portion 33 into the inner side airbag portion 22.

The check valve 50 is structured so as to, during the time when gas is flowing from the outer side airbag portion 33 into the inner side airbag portion 22, be opened and permit this flowing-in of gas. Further, the check valve 50 is structured so as to, when the flowing of gas from the outer side airbag portion 33 into the inner side airbag portion 22 stops, be closed and restrict the flowing-out of gas from the inner side airbag portion 22 to the outer side airbag portion 33.

Figure 8A:
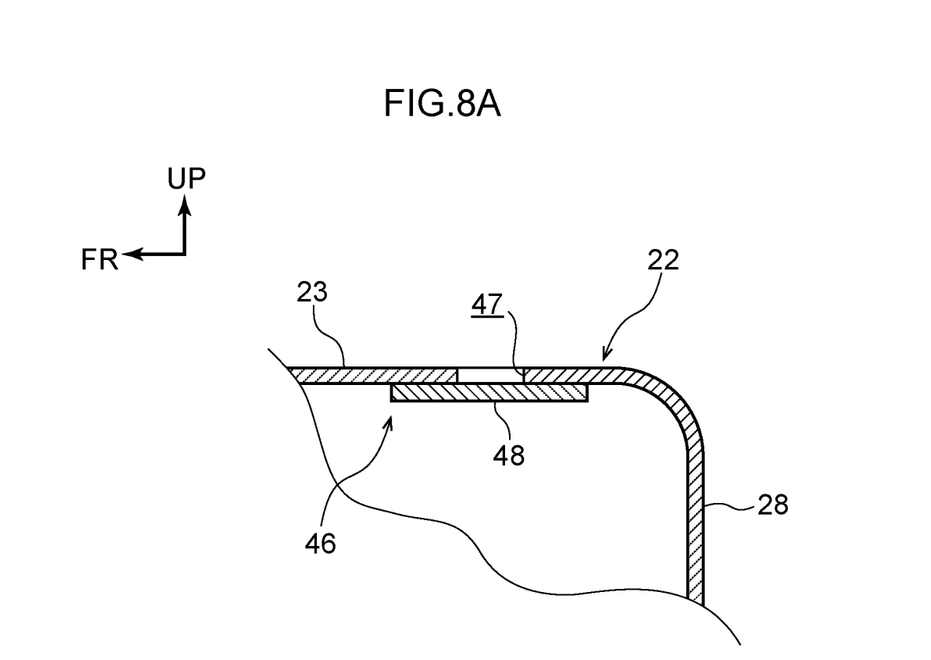
FIG. 8A is a partially-enlarged, side sectional view of FIG. 7A and illustrates the structure of a variable vent hole.
Figure 8B:
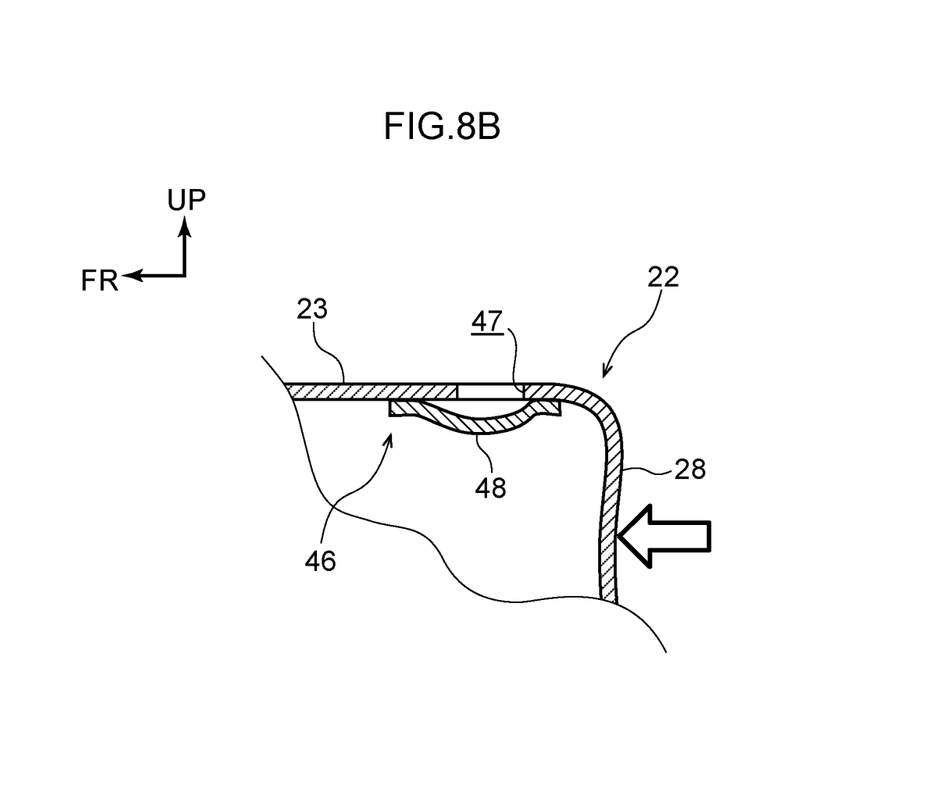
FIG. 8B is a partially-enlarged, side sectional view of FIG. 7B and illustrates the structure of the variable vent hole.

The variable vent hole 46 is structured by a vent hole 47 that is circular and is formed in the upper surface portion 23 at the front-rear chamber 34 side and the rear surface portion 28 side of the inner side airbag portion 22, and a cover member 48 that closes the vent hole 47 from the interior at the time of inflation/expansion of the inner side airbag portion 22 (at the time when gas flows from the left-right chamber 35 of the outer side airbag portion 33 into the inner side airbag portion 22), and that opens the vent hole 47 at the time when the head of the passenger P is restrained.

For example, the cover member 48 is a cloth member of a predetermined width (a width that can close the vent hole 47) that extends in the front-rear direction, and is formed of the same base cloth as the inner side airbag portion 22. Further, the front-rear direction one end portion and another end portion of the cover member 48 are respectively attached by sewing or the like to the upper surface portion 23 at the front-rear chamber 34 side and the rear surface portion 28 side of the inner side airbag portion 22 (i.e., at the both sides of the vent hole 47 in the front-rear direction).

In accordance with the inner side airbag portion 22 that is structured in this way, at the time of inflation/expansion when gas flows-in from the outer side airbag portion 33, the check valve 50 opens, and the internal pressure of the inner side airbag portion 22 is made to be the same as the internal pressure of the outer side airbag portion 33. Due thereto, tensile forces toward the front-rear direction outer sides act on the cover member 48, and therefore, the vent hole 47 is closed from the interior by the cover member 48.

Further, because the flowing-in of gas from the outer side airbag portion 33 is stopped at the time when the head of the passenger P is restrained, the check valve 50 is set in a closed state, and, while the internal pressure of the outer side airbag portion 33 is maintained at a high pressure, the inner side airbag portion 22 is crushed from the rear surface portion 28 (the head restraining surface) side thereof toward the front by the head Ph of the passenger P. Namely, the upper surface portion 23 at the front-rear chamber 34 side of the inner side airbag portion 22 is deformed toward the front. Due thereto, the tensile forces directed toward the front-rear direction outer sides that were applied to the cover member 48 are cancelled, and the front-rear direction central portion of the cover member 48 flexes toward the lower side, and the vent hole 47 is opened.

Accordingly, at the time when the head of the passenger P is restrained, the internal pressure of the inner side airbag portion 22 can be reduced, and the inner side airbag portion 22 can be made to be soft, while the internal pressure of the outer side airbag portion 33 is maintained at a high pressure. Due thereto, because the head Ph of the passenger P can be moved over a long stroke toward the front side, the head Ph of the passenger P slipping-out from the airbag main body 32 can be suppressed, and rearward tilting of the neck of the passenger P can be suppressed.

Although the in-seat airbag devices 30 relating to the present embodiments have been described above on the basis of the drawings, the in-seat airbag devices 30 relating to the present embodiments are not limited to the illustrated structures, and the designs thereof can be changed appropriately within a scope that does not depart from the gist of the present disclosure. For example, the structures of the respective embodiments (including the modified example as well) of the in-seat airbag devices 30 relating to the present embodiments may be combined appropriately.

Further, the opening/closing structure of the cover member 48 that structures the variable vent hole 46 is not limited to the above-described structure. Any structure may be used provided that it is a structure in which the cover member 48 is closed when gas flows from the outer side airbag portion 33 (the left-right chamber 35) into the inner side airbag portion 22, and the cover member 48 is opened at the time when the head of the passenger P is restrained (is opened due to the head Ph of the passenger P crushing the inner side airbag portion 22 toward the front side).

What is claimed is:

1. An in-seat airbag device having an airbag main body that is structured so as to comprise:

an outer side airbag portion having a front-rear chamber that, due to gas jetted-out from an inflator that operates due to a collision of a vehicle being detected or predicted, is configured to expand past one side of a head of a passenger toward a seat front side and is configured to be disposed at the one side of the head of the passenger, a left-right chamber that expands from a seat front side end portion of the front-rear chamber toward a seat width direction inner side and is configured to be disposed at a seat front side of a face of the passenger, a distal end chamber that expands from a seat width direction inner side end portion of the left-right chamber toward a seat rear side and is configured to be disposed at another side of the head of the passenger, and a tether that joins the front-rear chamber and the distal end chamber; and an inner side airbag portion that, due to gas that flows therein from the outer side airbag portion, expands and is disposed between the front-rear chamber, the left-right chamber and the distal end chamber, and has a head restraining surface that is configured to retrain the head of the passenger.

2. The in-seat airbag device of claim 1, wherein, as seen in plan view, a projecting portion, which projects-out further toward a seat rear side than a front-rear chamber side, is formed at a distal end chamber side of the head restraining surface of the inner side airbag portion.

3. The in-seat airbag device of claim 2, wherein, as seen in plan view, a length in a seat front-rear direction of the inner side airbag portion except for the projecting portion is made to be longer than a length in a seat width direction.

4. The in-seat airbag device of claim 1, wherein, as seen in plan view, the inner side airbag portion is formed substantially in a shape of an oval having a predetermined thickness in a seat width direction, and a seat rear side end portion of the inner side airbag portion is disposed at an incline with respect to a seat front-rear direction so as to move away from the front-rear chamber.

5. The in-seat airbag device of claim 1, wherein:

a vent hole through which the gas is discharged is formed in the inner side airbag portion, and an opening surface area of the vent hole is made to be larger than an opening surface area of a flow-in port that is for the gas to flow-in from the outer side airbag portion into the inner side airbag portion.

6. The in-seat airbag device of claim 1, wherein:

a check valve, which permits flowing-in of the gas from the outer side airbag portion into the inner side airbag portion and restricts flowing-out of the gas from the inner side airbag portion to the outer side airbag portion, is provided at a flow-in port that is for the gas to flow-in from the outer side airbag portion into the inner side airbag portion, and a variable vent hole, which is closed while the gas is flowing in from the outer side airbag portion into the inner side airbag portion and is configured to be opened when the head of the passenger is restrained, is provided at the inner side airbag portion.

7. The in-seat airbag device of claim 1, wherein the tether is formed in a substantial "Y" shape as seen in plan view, the tether having one end portion attached to the distal end chamber, and having a front side other end portion and a rear side other end portion, which are separated from each other in a seat front-rear direction and are respectively attached to the front-rear chamber.

* * * * *